March 4, 1941.   R. GARLAND   2,233,838
SIGNAL SWITCH
Filed Nov. 9, 1939
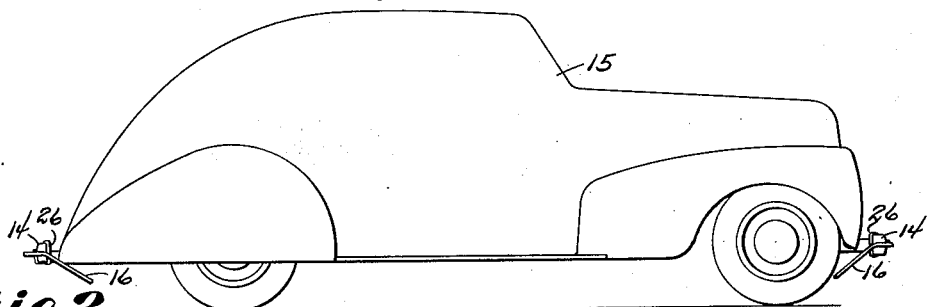
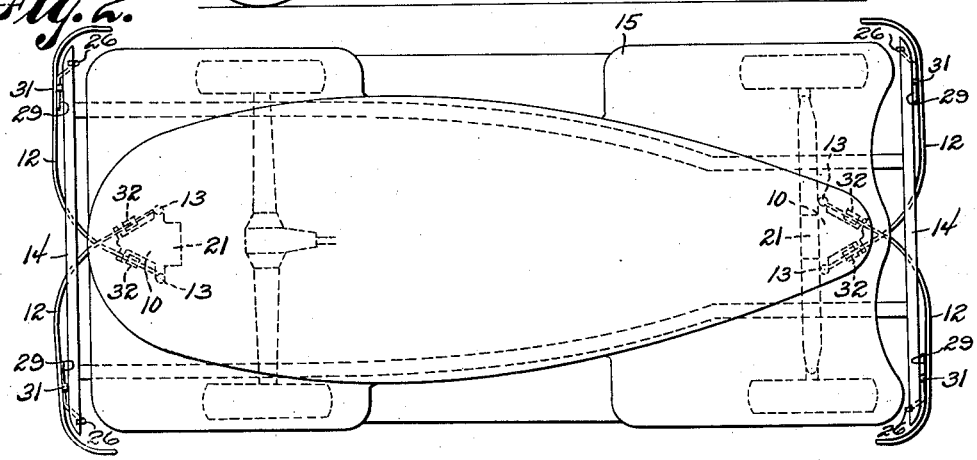
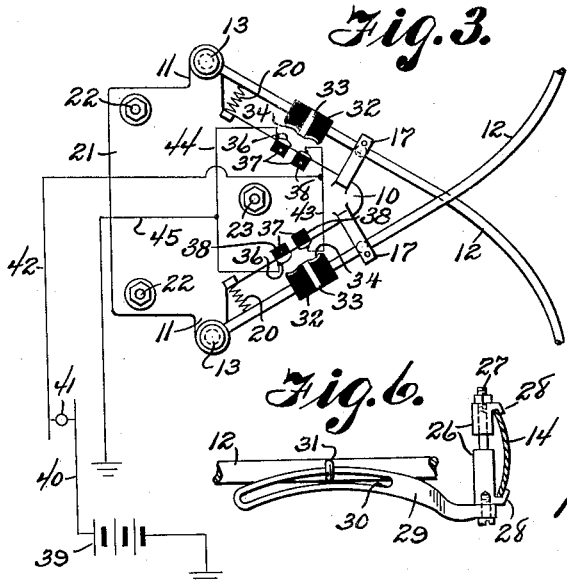
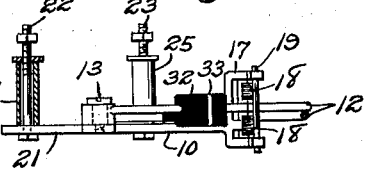
Rowland Garland
INVENTOR
BY Victor J. Evans & Co.
ATTORNEYS Patented Mar. 4, 1941

2,233,838

UNITED STATES PATENT OFFICE 2,233,838

SIGNAL SWITCH

Rowland Garland, Pittsburgh, Pa.

Application November 9, 1939, Serial No. 303,663

1 Claim. (Cl. 200—52)

This invention relates to signal devices for motor vehicles and has for an object to provide a device of this character having a plurality of feeler arms adapted to be secured to the vehicle and extend across the front and back beyond the bumpers to form circuit closers for controlling an electrical alarm device which will indicate to a driver when he is too close to the curb, or to other vehicles, or to other obstructions, when backing or pulling out of small spaces.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a side elevation of a motor vehicle equipped with signaling devices constructed in accordance with the invention.

Figure 2 is a plan view of the vehicle and signaling devices shown in Figure 1.

Figure 3 is a plan view of the mounting plate, pivoted feeler arms, and switches forming one of the signal devices.

Figure 4 is a side elevation, with parts in section, of the device shown in Figure 3.

Figure 5 is a detail sectional view showing one of the bridging switch contacts.

Figure 6 is a longitudinal sectional view of one of the bumpers, and showing the means for attaching a feeler arm thereto in elevation.

Referring now to the drawing in which like characters of reference designate similar parts in the various views, each signal device comprises a substantially triangular plate 10, best shown in Figure 3, having lateral hinge ears 11 to which feeler arms 12 are pivoted by pivot bolts 13. The arms extend along the inclined sides of the plate 10 and are crossed over each other adjacent the apex of the plate and then are extended longitudinally outside of a respective bumper 14 of the motor vehicle 15. The arms are curved at the outer ends, as shown at 16 in Figure 1, to extend along the sides of the vehicle approximately six inches above the ground.

As best shown in Figure 4 the arms are yieldably supported on the triangular plate by respective yokes 17 the arms of which extend horizontally. A pair of helical springs 18 are secured to the upper and lower arms of each yoke and are secured at their confronting ends to a respective feeler arm 12. A stop bolt 19 is passed through the free ends of the yoke arms and prevents the feeler arms for being urged too far outwardly by respective helical springs 20 which are interposed between the pivoted ends of the arms and the respective edges of the triangular plate 10 as best shown in Figure 3.

Each triangular plate is provided with a substantially rectangular extension 21, best shown in Figures 3 and 4, which carries a pair of securing bolts 22 which cooperate with a similar securing bolt 23 carried by the triangular plate to secure the plate to the bottom of the vehicle. The bolts are provided with respective spacing sleeves 24 and 25 which space the plate 10 below the bottom of the vehicle.

For yieldably securing the feeler arms 12 to the bumpers 14, a pair of tubular clamp members 26, best shown in Figure 6, are connected together by a draw bolt 27 and are provided with hooks 28 which hook over the bumper. Each draw bolt has swivelly mounted thereon a link 29 which is curved at the free end and is provided an arcuate slot 30. A hook 31 projects from the respective feeler arm 12 and is engaged through the slot. As shown in Figure 6 the link 29 is turned at a right angle to the bumper to more clearly show the construction, although it would normally extend along the bumper, as shown in Figure 2.

Each feeler arm 12 is equipped with a bridging switch contact, best shown in Figure 5. The switch contact comprises a tubular insulating base 32 which is sleeved upon the respective feeler arm adjacent to the edge of the respective triangular plate and is secured to the feeler arm by a ring 33 which compresses the tubular base, preferably formed of rubber, snugly upon the feeler arm. A metal plate 34 is secured to the inner longitudinal face of the base by integral pins 35 and is also confined in place by the link 33.

A pair of stationary switch contacts 36, preferably embedded in insulating bases 37, are secured to the triangular plate by securing bolts 38 and are located so as to be bridged by the respective bridging contact 34.

The electrical connections are also shown in Figure 3 to comprise a battery 39, which is connected by conductor 40 to a signal lamp 41 which latter is connected by a conductor 42 to a conductor 43 which connects together a pair of the stationary contacts. A conductor 44 connects together the other pair of stationary contacts and is grounded by a conductor 45.

In operation when the driver is too close to an obstruction, either on the front, rear or on either side, to complete an attempted maneuver with safety, a corresponding one of the feeler arms 12 will impinge against the obstruction and close the alarm circuit at its switch contacts. Thus the driver will be warned in ample time to cease maneuvering at once in the intended direction.

From the above description it is thought that the construction and operation of the invention will be fully understood without further explanation.

What is claimed is:

The combination with an automobile bumper bar of a base plate secured to the bottom of the automobile and spaced therefrom adjacent the bumper bar, a feeler arm pivoted at one end on the base plate and slidably mounted on the bumper bar, a yoke on the base plate, a spring connected to the arm and to the yoke yieldably supporting the arm in the yoke, a stop pin carried by the yoke, a spring connected to the rear end of the arm and to the base plate yieldably holding the arm against the stop pin, a pair of stationary switch contacts on the base plate, and a switch contact on the arm adapted to bridge the stationary switch contact when the arm is swung away from the stop pin by contact with an obstruction.

ROWLAND GARLAND.